United States Patent Office

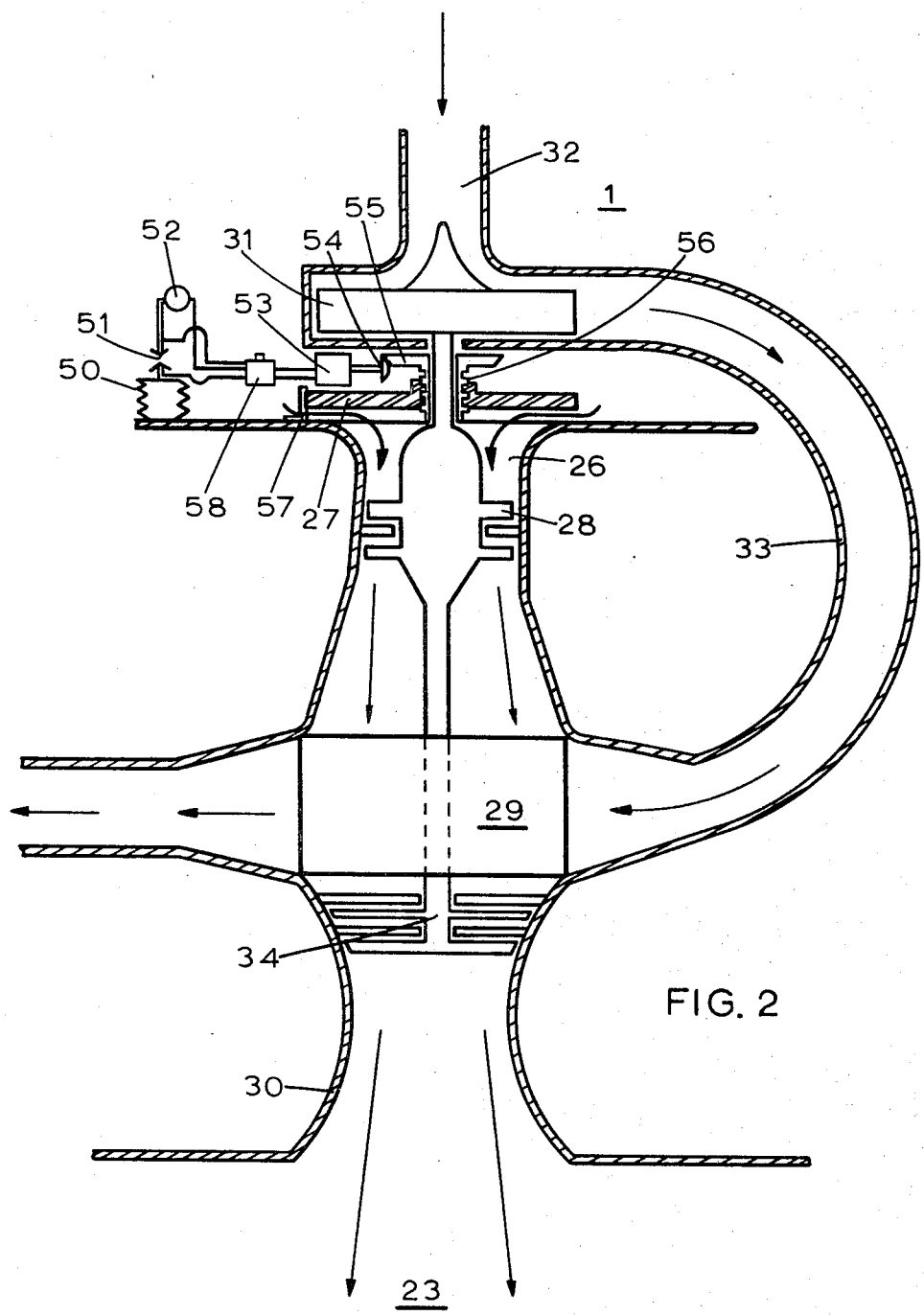

3,369,777
Patented Feb. 20, 1968

3,369,777
AIRCRAFT COOLING SYSTEM
Owen D. A. C. Furlong, East Coker, near Yeovil, Somerset, England, assignor to Westland Aircraft Limited, Yeovil, Somerset, England
Filed Jan. 14, 1966, Ser. No. 520,608
Claims priority, application Great Britain, Jan. 22, 1965, 3,025/65
5 Claims. (Cl. 244—59)

ABSTRACT OF THE DISCLOSURE

Apparatus providing temperature insulation for an aircraft having a pressurised cabin, wherein air is recirculated between double skinning of the fuselage by a fan which draws air from the cavity formed by the double skinning, and passes it through a heat exchanger before returning it to the cavity. The heat exchanger provides heat transfer with air discharged from the cabin and cooled by expansion through a turbine which drives the fan.

BACKGROUND OF THE INVENTION

(1) Field of the invention

The present invention relates to aircraft cooling systems, and in particular to skin and wall cooling systems for high altitude high-speed aircraft and other aerial vehicles. For convenience all types of aerial vehicles will be referred to hereinafter generically as aircraft.

(2) Description of the prior art

An aircraft flying at high altitudes at high Mach numbers encounters conditions which impose extremely large cooling demands upon its air conditioning apparatus, due to the aircraft skin being unable to dissipate heat to the ambient atmosphere, and, in cases of extremely high speed, absorbing heat due to skin friction.

A known type of arrangement for effecting some control of temperature within an aircraft cabin comprises a double skinning in the cavity of which various forms of thermal lagging are attached in a manner that permits air to pass therebetween, and in some instances to pass to the cabin and in others to discharge overboard.

It is an object of the present invention to provide a cooling system for the cabin walls of aircraft which will enable the amount of thermal lagging and thus the weight to be reduced.

SUMMARY OF THE INVENTION

The purpose of the present invention is to provide a cooling system associated with the fuselage skinning or cabin walls of an aircraft, wherein recirculation of cool air within the skinning or wall cavities is effected by means utilising power obtained from the normal wastage of pressurised cabin air discharging to ambient.

In the present invention a proportion of the cabin fresh air throughput is discharged from the cabin via a turbine, and the power absorbed from the turbine is used to drive a fan which circulates air around the lagging system. Because of the relatively low pressure drop in the recirculation system the flow ratio between air pumped by the fan and air expanded through the turbine is quite high. On leaving the turbine the discharged air is at a low temperature due to the expansion and the work extracted from it, and this cold air is passed through a heat exchanger, before either being discharged overboard through a thrust nozzle, or, in the case where power is available from the turbine in excess of the requirements of the fan, the turbine also drives a compressor which recompresses the air from the heat exchanger before discharging the air overboard through the thrust nozzle.

Two embodiments of the invention are given by way of example only in the following description of carrying the invention into effect. The embodiments are shown diagrammatically in the accompanying drawings, in which:

FIGURE 2 represents an alternative embodiment of the cooling unit for the lagging space.

Figure 1:
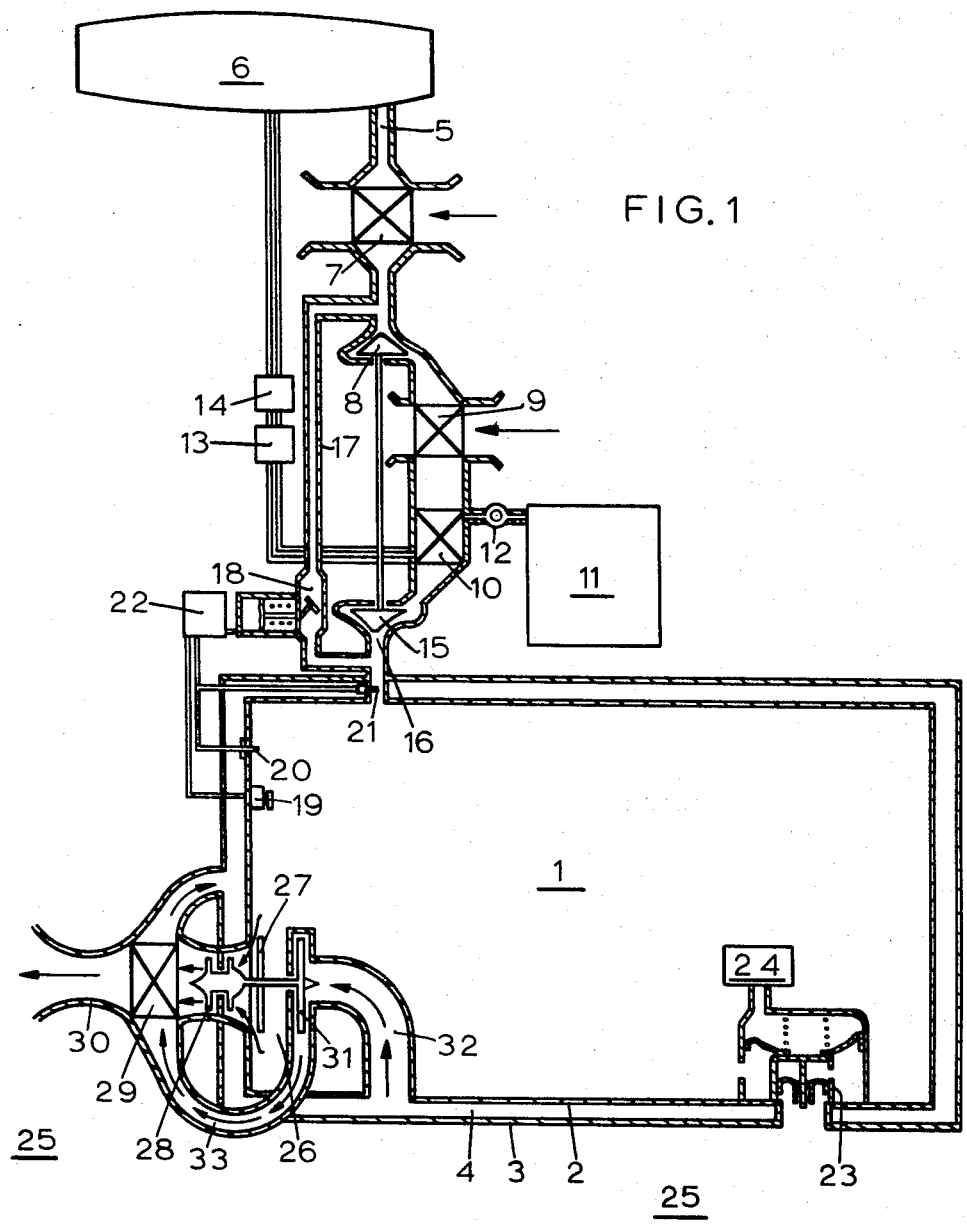
FIGURE 1 represents a complete system employing the invention for cooling the lagging space between spaced cabin walls.

In FIGURE 1, an aircraft cabin 1 is provided with a double wall thickness comprising an inner skin or trim 2 and an outer skin 3 spaced apart so that cooling air can be circulated between the two walls 2 and 3, either through suitable channels or substantially over the whole surface of the inner and outer skins.

Air for circulation in the lagging space 4 can be tapped from an aircraft engine 6 in the same manner as and at a similar pressure to the cabin interior air to form a separate cooling system, or the air can be allowed to leak from the cabin 1 through the inner skin or trim 2 to be controlled at the same pressure as that of the cabin air and to form part of an integrated cabin cooling system, as in the present embodiment. Or alternatively, air can be ducted directly from the cabin 1 to the lagging space 4 at one or more points or orifices provided for the purpose, to avoid differential pressures between the lagging space 4 and the cabin 1.

In the system embodying the present invention air for pressurising the cabin 1 is bled through a duct 5 tapping the hot compressed air from an aircraft engine 6 and cooling this air by passage first through a first heat exchanger 7 cooled by ram air. The air is then compressed in a compressor 8 to raise the temperature for improved efficiency in heat exchange and cooled by passing through second and third heat exchangers 9 and 10. The second heat exchanger 9 is also cooled by ram air and the cooling medium for the third heat exchanger 10 is fuel pumped from a fuel tank 11 by a pump 12 on its way through other heat exchangers 13 for oil cooling, etc. and control gear 14 to supply the engine 6.

The compressed air is further cooled by expansion through a turbine 15 directly coupled to drive the compressor 8 and the air is discharged through a duct 16 into the cabin 1. The temperature of the cooled air is adjusted by admitting warm air from a duct 17, which bypasses the heat exchangers 8 and 9 under the control of valve 18 which is in turn controlled by a cabin temperature selector 19, a cabin temperature sensor 20, a duct temperature sensor 21 and temperature control gear 22.

In order to control the pressure in the cabin 1, a discharge valve 23 controlled by pressure selector gear 24 opens to discharge cabin air to ambient 25, when the pressure in the cabin 1 reaches a selected value.

Air in the cabin 1 is continuously changed to avoid stagnation and condensation, and this is usually achieved by continuous discharge of cabin air to ambient 25 through the discharge valve 23, but in the present invention cabin air is preferably discharged through an outlet duct 26 at the rear of the fuselage and in parallel with the discharge valve 23. Discharge through this duct 26 is under the control of a cabin air shut-off valve 27, which can be manually or automatically controlled in association with the discharge valve 23 or an emergency pressure switch, so that if pressure is lost due to an excessive leakage the discharge to ambient 25 could be stopped even if some overheating occurred in the cabin. In the event of a limited leak the valve could be partially shut to maintain some cooling and pressure reduced from the normal pressure but sufficient to maintain life or avoid damage to cargo. A system such as this could operate as indicated diagrammatically in FIGURE 2, by action of an absolute capsule 50, so that when the pressure drops below an acceptable limit the capsule 50 expands and closes contacts 51 to connect power from a power source 52 to a motor 53 which drives a bevel gear 54 engaged with a gear wheel 55 on a threaded sleeve 56. The shut-off valve 27 engages with the threaded sleeve, but is prevented from rotation by a stop 57, so that the valve cannot rotate. Upon actuation of the motor the bevel gear 54 rotates the threaded sleeve and jacks the valve 27 to close. A reset button 58 is provided to connect the motor to the power source in the opposite sense to cause the threaded sleeve 56 to open the valve. Obviously many other means are available such as mechanical, pneumatic or hydraulic, to open or close the valve.

Returning to FIGURE 1, the air discharged from the cabin 1 through the outlet duct 26 expands through an axial flow cold air turbine 28 and then passes as the cooling medium through a heat exchanger 29, before being discharged to ambient 25 through a jet nozzle 30 which produces a thrust recovery from the air discharged.

In aircraft flying at very high altitudes a high differential exists between the cabin pressure and ambient air, and the energy from air being continuously discharged from the high to the low pressure is considerable. Thus in the system proposed the air being discharged from the cabin 1 drives the turbine 28 and this in turn drives a fan 31 which draws air through a duct 32 from the lagging space 4 and blows the air through a duct 33 to the heat exchanger 27, where the air is cooled by contra flow in thermal relationship with the air cooled by expansion through the turbine 28. The air from the lagging space 4 cooled in the heat exchanger 29 is returned to the lagging space 4 and serves to reduce the cabin wall temperatures and the temperature of any associated lagging whenever the aircraft is flying at a speed sufficiently high to produce excessive heat by skin friction.

In the embodiment as shown in FIGURE 2, the turbine 28 develops considerably more power than is required to drive the fan 31, and accordingly the additional power is used to drive a two-stage axial flow compressor 34 downstream of the heat exchanger 29 and develop extra pressure at the thrust nozzle.

In an example of the invention it can be shown that an aircraft operating with a cabin altitude of 6,000 feet or 11.775 pounds per square inch absolute at a temperature of 27° C. when flying at 65,000 feet and discharging 100 pounds per minute of cabin air to ambient at 0.816 p.s.i.a. can develop about 77 horsepower in the turbine 28. A recirculating fan 31 giving a 1.6 p.s.i. pressure rise at a recirculating temperature of 50° C. for air coming from the lagging space 4 would require 27 horsepower. Thus 50 horsepower remains from the turbine 28 to drive the exhaust compressor 34 (FIGURE 2) which develops a pressure ratio of 1.44 and a thrust recovery of 75 lbs. as compared with a thrust of 95 lbs. obtainable by discharging cabin air direct to ambient through a thrust nozzle.

Using a single pass crossflow heat exchanger of a light alloy construction a useful cooling load of 8.9 tons can be obtained, even with a small heat exchanger 29, and by increasing the size of the heat exchanger the load can easily be raised to 12.8 tons.

Direct use of cabin air for interwall cooling or lagging cooling would only provide a useful load of 4.9 tons assuming an interwall flow outlet temperature of 50° C. If the interwall outlet temperature were lowered to 35° C. a system according to the invention will still give 7.1 tons useful load, whilst direct discharge of cabin air through the lagging would only give 1.7 tons, showing a marked relative advantage for the turbine system.

At high Mach numbers the recirculating flow required in the lagging space 4 rises considerably and greatly exceeds the cooling capacity of the cabin airflow discharge, but a system according to the invention can provide high enough airflow at least up to Mach 2.7. With increasing Mach numbers the resulting fan 31 is large and needs to run at a slower speed than the turbine 28, and accordingly the fan 31 will have to be driven through speed reduction gearing from the turbine. At such speeds the whole output of the turbine would be absorbed by the fan and there would be no excess power for a thrust recovery compressor. Also at very high speeds it may be preferable to circulate a larger quantity of air than is required to be cooled, in this case some of the output of the fan 31 can be ducted to bypass the heat exchanger 29 and be returned directly from the fan 31 to the lagging space 4.

In addition the passage of cabin air directly through the lagging would lead to cumulative contamination, particularly by tobacco smoke.

The cooling system described discloses the use of the cold air at the turbine 28 outlet to cool the interwall flow, but it could equally well be used for other purposes, for example, additional cooling of cabin charge flow or of hydraulic and electrical equipment.

Various other modifications can be made without departing from the scope of the invention, such as other brake devices either inside or outside the aircraft can be fitted to absorb surplus power available from the turbine 28 and do useful work. Alternatively, a restrictor provided in the fan duct could be used to match the power of the turbine 28 to that required by the fan 31 and prevent overspeeding of the turbine, or to absorb some of the surplus turbine power by raising the pressure and temperature of the recirculated air in the heat exchanger circuit to improve the thermal ratio.

At low altitudes the system will idle over without much effect, but a shutdown arrangement can be provided by way of the restrictor 27. Even if conditions are such that little cooling is provided, power which would otherwise be wasted is available to circulate cooling air provided by the main cabin cooling system, thus eliminating the need for electric fans. The system now proposed also provides a lower temperature heat sink than would otherwise be available.

In addition, a plurality of turbines, fans and heat exchangers could be used if the heat loads justified such a requirement. Also the space 4 between the inner 2 and outer 3 skins could form a sealed cooling system, in which fluid medium other than air could be used. It will also be appreciated that the lagging could comprise a plurality of skins with interspaces between them or a honeycomb arrangement might be employed.

Besides these variations it is obviously possible to employ radial flow turbines or radial flow compressors, if these were more convenient, to obtain the required cooling characteristics.

I claim as my invention:

1. In an aircraft including a pressurized cabin having double walls defining a space therebetween, a cooling system comprising a heat exchanger, expansion turbine means located upstream of said heat exchanger and driven by outflowing air from the interior of said cabin for cooling said outflowing air and passing the cooled air through said heat exchanger, fan means driven by said turbine means for abstracting a fluid from the space between said double walls, and ducting means for passing the fluid abstracted by said fan means through said heat exchanger to be cooled and back to said space between said walls.

2. A cooling system for an aircraft, as claimed in claim 1, wherein a compressor driven by said turbine means is sited downstream of said heat exchanger to recompress air having passed through said turbine and said heat exchanger.

3. A cooling system for an aircraft, as claimed in claim 1, wherein air discharged from said heat exchanger is discharged through a thrust nozzle directed towards the rear of the aircraft, whereby the air discharged from the thrust nozzle augments the thrust reacting to drive the aircraft.

4. A cooling system for an aircraft, as claimed in claim 1, wherein the fluid abstracted by said fan means is air.

5. A cooling system for an aircraft, as claimed in claim 1, wherein said turbine is an axial flow turbine.

References Cited
UNITED STATES PATENTS

| | | | |
|---|---|---|---|
| 2,477,932 | 8/1949 | King | 62—402 |
| 2,540,331 | 2/1951 | Hlavaty. | |
| 2,734,356 | 2/1956 | Klinhans. | |
| 2,767,561 | 10/1956 | Seeger | 62—402 X |

FERGUS S. MIDDLETON, *Primary Examiner.*

MILTON BUCHLER, *Examiner.*

B. BELKIN, *Assistant Examiner.*